US012323439B2

(12) United States Patent
Ezrielev et al.

(10) Patent No.: US 12,323,439 B2
(45) Date of Patent: Jun. 3, 2025

(54) SYSTEM AND METHOD FOR DEVICE AUTHENTICATION IN A DISTRIBUTED ENVIRONMENT USING A TWIN INFERENCE MODEL

(71) Applicant: Dell Products L.P., Round Rock, TX (US)

(72) Inventors: Ofir Ezrielev, Be'er Sheva (IL); Jehuda Shemer, Kfar Saba (IL); Ronen Rabani, Kibuts Telalim (IL)

(73) Assignee: Dell Products L.P., Round Rock, TX (US)

( * ) Notice: Subject to any disclaimer, the term of this patent is extended or adjusted under 35 U.S.C. 154(b) by 342 days.

(21) Appl. No.: 18/188,012

(22) Filed: Mar. 22, 2023

(65) Prior Publication Data
US 2024/0323201 A1  Sep. 26, 2024

(51) Int. Cl.
H04L 9/40  (2022.01)
(52) U.S. Cl.
CPC ................ H04L 63/1416 (2013.01)
(58) Field of Classification Search
CPC ................................. H04L 63/1416
USPC ................................................ 726/6
See application file for complete search history.

(56) References Cited

U.S. PATENT DOCUMENTS

| | | | | |
|---|---|---|---|---|
| 2008/0216160 A1* | 9/2008 | Rollet | ............ | H04L 63/205 726/6 |
| 2014/0259130 A1* | 9/2014 | Li | ............ | G06F 21/31 726/6 |
| 2015/0033305 A1* | 1/2015 | Shear | ............ | G06F 21/53 726/11 |
| 2016/0072787 A1* | 3/2016 | Balabine | ............ | H04L 63/12 726/6 |
| 2020/0244681 A1* | 7/2020 | Klawe | ............ | G06Q 20/382 |

(Continued)

OTHER PUBLICATIONS

"Zero Trust—Revolutionary approach to Cyber or just another buzz word?" Deloitte LLP, 2021 (16 Pages).

(Continued)

Primary Examiner — Badri Narayanan Champakesan
Assistant Examiner — Badri Champakesan
(74) Attorney, Agent, or Firm — WOMBLE BOND DICKINSON (US) LLP

(57) ABSTRACT

Methods and systems for authenticating data processing systems throughout a distributed environment without user intervention are disclosed. To authenticate data processing systems without user intervention, a system may include a network core and one or more data processing systems. A previously established root of trust between the network core and a data processing system may be lost and the network core may attempt to re-authenticate the data processing system using shared knowledge. The shared knowledge may be based on data obtained from the data processing system and an inference generated by a twin inference model. The network core may provide the data processing system with a security questionnaire based on the shared knowledge and the data processing system may use the twin inference model to respond to the security questionnaire. If the answers to the security questions are considered accurate, the data processing system may be re-authenticated.

20 Claims, 12 Drawing Sheets

(56) References Cited

U.S. PATENT DOCUMENTS

| | | | |
|---|---|---|---|
| 2022/0141026 A1* | 5/2022 | Smith | H04L 9/0891 |
| | | | 713/181 |
| 2022/0255924 A1* | 8/2022 | Michaud | G06N 20/00 |
| 2023/0103518 A1* | 4/2023 | Rogers | G06F 21/71 |
| | | | 726/26 |

OTHER PUBLICATIONS

Awati, Rahul, et al., "certificate revocation list (CRL)" TechTarget, Web Page <https://www.techtarget.com/searchsecurity/definition/Certificate-Revocation-List> accessed on Nov. 22, 2022 (9 Pages).

* cited by examiner

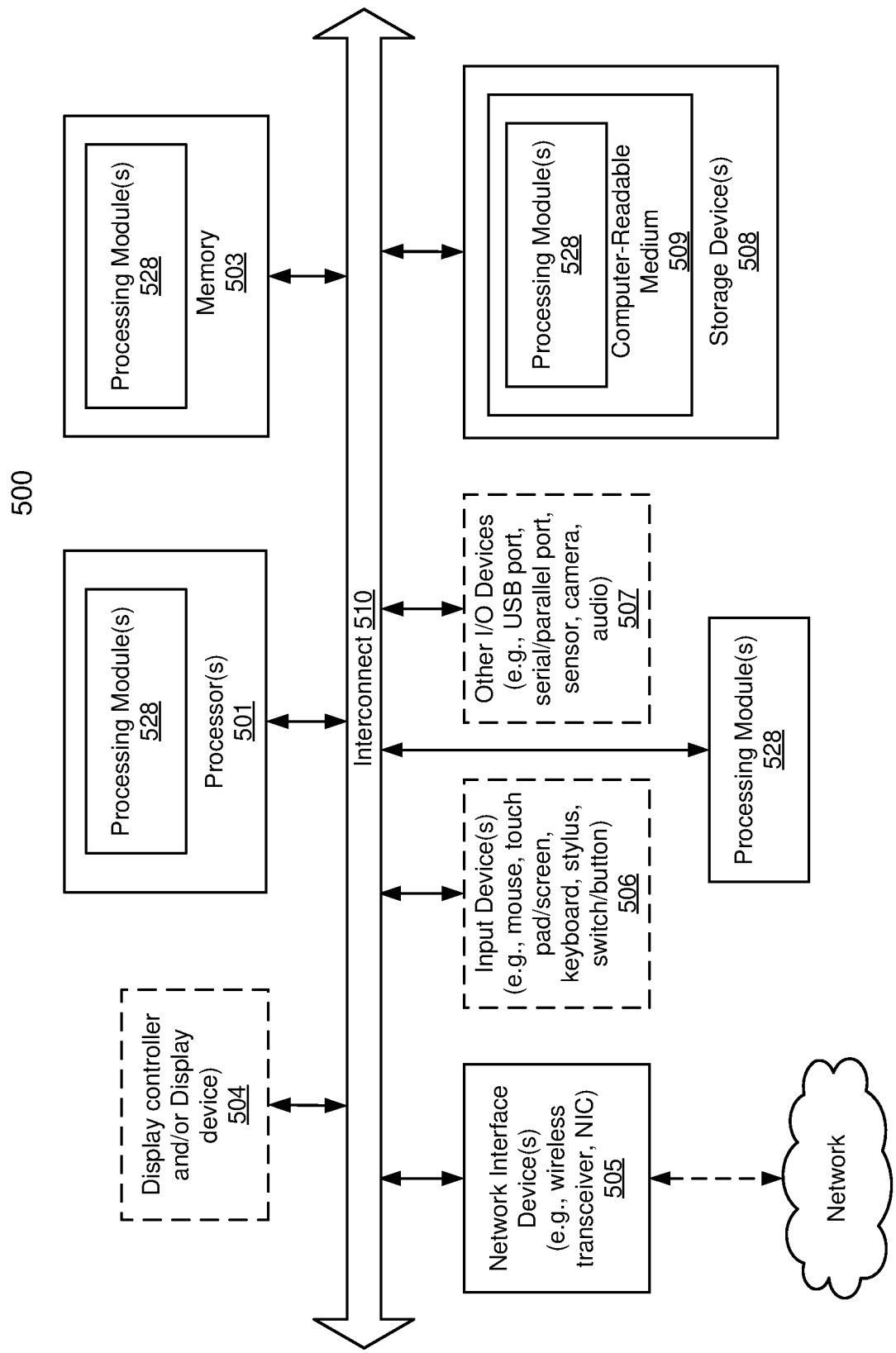

SYSTEM AND METHOD FOR DEVICE AUTHENTICATION IN A DISTRIBUTED ENVIRONMENT USING A TWIN INFERENCE MODEL

FIELD

Embodiments disclosed herein relate generally to device authentication. More particularly, embodiments disclosed herein relate to systems and methods to reduce computing resource expenditure while performing device authentication throughout a distributed environment.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 5 shows a block diagram illustrating a data processing system in accordance with an embodiment.

DETAILED DESCRIPTION

Figure 1:
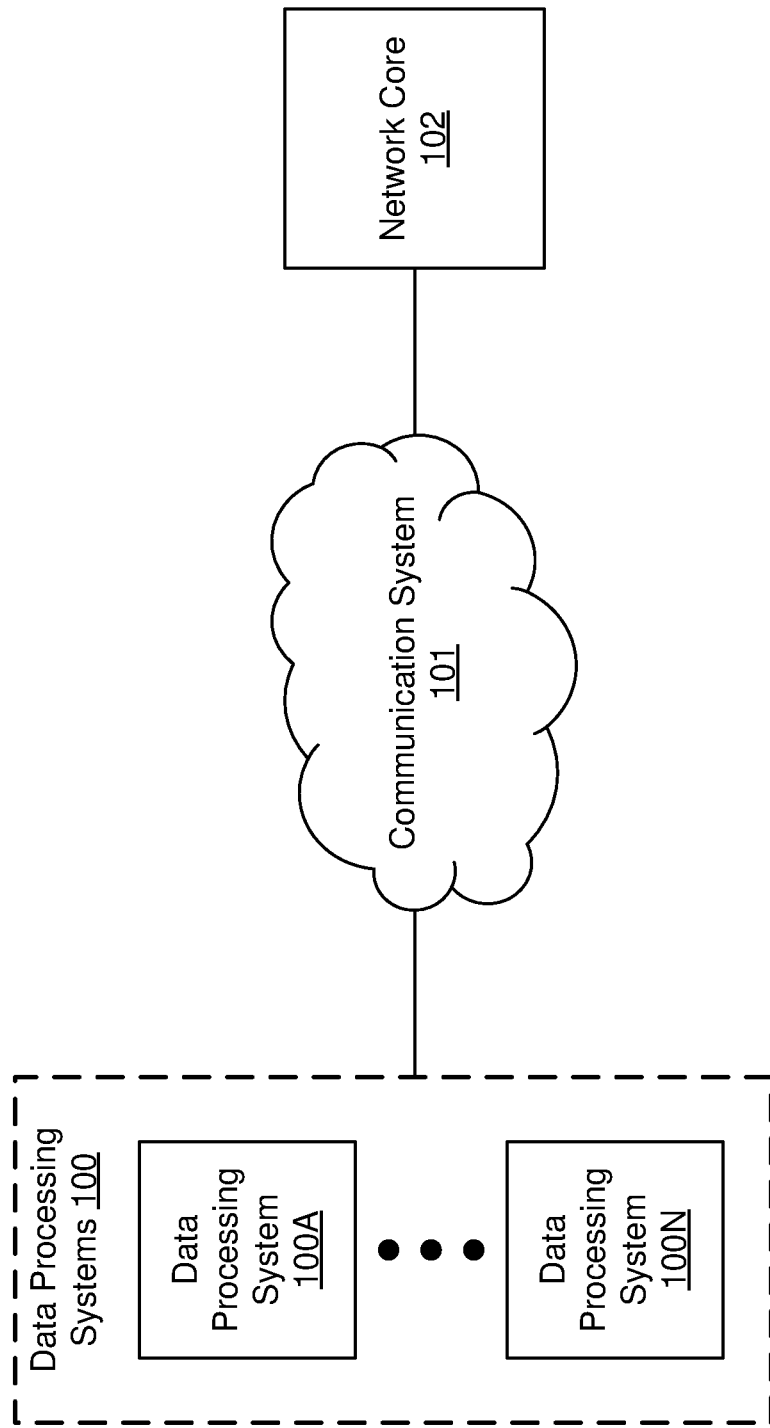
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for authentication of a data processing system throughout a distributed environment without user intervention. To authenticate the data processing system without user intervention, the system may include a network core. The network core may initially establish a root of trust with the data processing system via user intervention (a user, for example, entering a password, pin, fingerprint scan, etc.). Once the root of trust is established, a secure communication channel may be opened between the network core and the data processing system and data may be exchanged via the secure communication channel.

However, the root of trust may become lost due to, for example, a duration of time passing, a password change, a cryptographic key change, etc. Re-establishing the root of trust with the data processing system (e.g., throughout an environment that may be highly distributed with a large number of data processing systems) may be a computationally expensive and time-consuming process. This process may require, for example, a user to re-enter a password, answer security questions, physically re-locate one or more data processing systems, and/or may require other means of user intervention.

To conserve computing resources and efficiently re-establish the root of trust with data processing systems throughout a distributed environment, the system may generate a security questionnaire based on shared knowledge known to both the network core and the data processing system. Historical telemetry data provided by the data processing system prior to the loss of the root of trust may be used as the shared knowledge. However, authentication processes may occur repeatedly for the data processing system over time. In addition, the stored historical telemetry data may be utilized for other purposes, such as validating commands for an internet of things device. Using the historical telemetry data to generate security questions (for re-authentication, validating commands, etc.) may lead to a potential shortage of unused (and, therefore, available for use in authentication) historical telemetry data and/or a limited scope of available telemetry data.

To ensure availability of shared knowledge to perform processes as needed, the shared knowledge may be based on data points provided by the data processing system after the loss of the root of trust. As communications between the network core and the data processing system may no longer be considered secure (thereby exposing the data points), the shared secret may also be based on an inference generated using a twin inference model.

A first inference model of the twin inference model may be hosted and operated by the network core and a second inference model of the twin inference model may be hosted and operated by the data processing system. Therefore, inferences generated by the twin inference model may be obtained by both the network core and the data processing system without transmitting any inferences across the (potentially compromised) communication system.

The shared knowledge may include, for example, a difference between a data point of the data points and the inference. The shared knowledge may be used to generate a security question and the security question may be added to a security questionnaire. The system may provide the security questionnaire to the data processing system and receive a response including an answer to the security question. If the answer matches (at least substantially) a pre-determined answer to the security question, the network core may recognize the data processing system as authentic. Once the data processing system is recognized as authentic, the root of trust may be re-established, and secure communications may resume.

Thus, embodiments disclosed herein may provide an improved system for authenticating data processing systems throughout a distributed environment. To do so, devices may be re-authenticated following dissolution of a root of trust without intervention from a user and using shared knowledge derived using an inference model and without requiring storage of large amounts of data. Consequently, the root of trust may be efficiently re-established as needed throughout a distributed environment while conserving computing resources and without the intervention by a user.

In an embodiment, a method of authenticating a data processing system by a network core throughout a distributed environment is provided. The method may include: identifying an occurrence of an event indicating that the data processing system is to be authenticated; based on the occurrence of the event: obtaining a shared secret based on a measurement provided by the data processing system and an inference generated using a first inference model of a twin inference model; obtaining a security question based on the shared secret; obtaining a security questionnaire using at least the security question; and performing a validation of the data processing system using the security questionnaire.

The first inference model of the twin inference model hosted by the network core may be a copy of a second inference model of the twin inference model hosted by the data processing system.

The method may also include: prior to identifying the occurrence of the first event: obtaining the first inference model of the twin inference model; and distributing the second inference model of the twin inference model to the data processing system.

The method may also include: based on the occurrence of the event: obtaining a data point from the data processing system following a loss of a root of trust between the network core and the data processing system; and storing the data point in a first activity log hosted by the network core, the first activity log being substantially identical to a second activity log hosted by the data processing system.

Obtaining the shared secret may include: obtaining a data point of the telemetry data from the first activity log, the data point representing the measurement provided by the data processing system; obtaining the inference using the first inference model of the twin inference model, the inference being intended to predict the measurement represented by the data point; and obtaining a difference based on the data point and the inference.

Performing the first validation of the data processing system may include: providing the security questionnaire to the data processing system; obtaining a response to the provided security questionnaire from the data processing system, the response comprising an answer responsive to the security question of the security questionnaire; making a determination regarding whether the answer matches a pre-determined answer to the security question; and in an instance of the determination in which the answer matches the pre-determined answer: concluding that the data processing system is authentic.

The pre-determined answer may be obtained by the network core prior to obtaining the response and the pre-determined answer may be based, at least in part, on the difference.

The answer may be based on a second difference, the second difference being identical to the first difference and being obtained using the data point and the second inference model of the twin inference model hosted by the data processing system.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include any type and quantity of computer-implemented services. For example, the computer-implemented services may include monitoring services (e.g., of locations), communication services, and/or any other type of computer-implemented services.

To provide the computer-implemented services, the system may include network core 102. Network core 102 may provide all, or a portion of, the computer-implemented services. For example, network core 102 may provide computer-implemented services to users of network core 102 and/or other computing devices operably connected to network core 102. The computer-implemented services may include any type and quantity of services including, for example, authentication of data processing systems.

To facilitate authentication of data processing systems, the system may include one or more data processing systems 100. data processing systems 100 may include any number of data processing systems (e.g., 100A-100N). For example, data processing systems 100 may include one data processing systems (e.g., 100A) or multiple data processing systems (e.g., 100A-100N) that may independently and/or cooperatively facilitate the authentication of data processing systems.

All, or a portion, of the data processing systems 100 may provide (and/or participate in and/or support the) computer-implemented services to various computing devices operably connected to data processing systems 100. Different data processing systems may provide similar and/or different computer-implemented services.

When providing the computer-implemented services, the system of FIG. 1 may determine whether devices throughout a distributed system are authenticated prior to exchanging sensitive information. To do so, the system of FIG. 1 may establish a root of trust to each data processing system throughout the distributed environment.

However, roots of trust may be lost and/or otherwise become invalid over time. Re-establishing roots of trust may be a computationally expensive and time-consuming process, as highly distributed environments may include multiple data processing systems that may each individually require re-establishment of roots of trust at different times and/or via different means. Re-establishing a root of trust may require a user to, for example, answer security questions, may require the data processing systems to store additional authentication data, and/or may require other means of intervention by the user. By doing so, undesirable amounts of computing resources may be consumed by the data processing systems and/or the network core (which may each have a limited amount of computing resources available for operation and storage), and delays may occur in operation of the system.

In general, embodiments disclosed herein may provide methods, systems, and/or devices for maintaining authentication of data processing systems throughout a distributed environment without user intervention. To maintain authentication of data processing systems, the system of FIG. 1 may establish an initial root of trust to any number of data processing systems throughout the distributed environment.

In the event of a dissolution of the root of trust, the network core may generate a security questionnaire for use in re-authenticating the data processing system. The security questionnaire may include questions related to telemetry data of the data processing system (e.g., past communications, errors, updates, etc. of the data processing system). The security questionnaire may be provided to the data processing system and the data processing system may generate a response including answers to the questions in the security questionnaire.

As previously mentioned, re-authenticating data processing systems via this method may allow for data processing systems to be efficiently re-authenticated as needed over time without user intervention. However, re-authentication of the data processing system may occur any number of times, and telemetry data obtained prior to the loss of the root of trust may not be sufficient to meet the ongoing re-authentication needs of the data processing system and/or may be limited in scope so that only certain types of questions are available for re-authentication. In addition, the system may utilize the telemetry data provided by the data processing system for other purposes without user intervention (e.g., validating commands on an internet of things device). Doing so (repeatedly at any frequency) may expend the stored telemetry data available for these processes.

To ensure availability of telemetry data to perform processes (e.g., re-authentication of the data processing system, validation of commands, etc.), newly obtained data points (e.g., data points obtained following loss of the root of trust) may be used to generated shared knowledge. As the newly obtained data points may not be considered secure, the shared knowledge may also be based on an inference generated using the newly obtained data points and a twin inference model.

The twin inference model may be hosted by both the network core and the data processing system to be authenticated. Therefore, even in the event of exposure of the newly obtained data points by an unauthorized entity, the unauthorized entity would not be able to successfully respond to the security questionnaire without access to the twin inference model.

The data processing systems may generate answers to the security questions in the security questionnaire using the newly obtained data points and the twin inference model. The data processing system may provide a response to the network core and the network core may determine whether the answers provided in the response match previously determined accepted answers to the security questions. If the answers match the previously determined accepted answers, the data processing systems may be considered authentic. By doing so, data processing systems may be more efficiently re-authenticated following dissolution of a root of trust throughout a distributed environment. As a distributed environment may include many data processing systems and roots of trust may be revoked for various reasons over time, this method of re-establishing trust between the data processing systems and the network core without user intervention provides a timely and computationally efficient solution.

To provide the above noted functionality, the system of FIG. 1 may include network core 102. Network core 102 may (i) identify an occurrence of an event indicating that a data processing system is to be authenticated, (ii) obtain a shared secret based on a measurement provided by the data processing system and an inference generated using a first inference model of the twin inference model, (iii) obtain a security question based on the shared secret, (iv) populate a security questionnaire with at least the security question, and/or (v) perform a validation of the data processing system using the security questionnaire.

The occurrence of the event may include a dissolution of a previously established root of trust. A root of trust may be lost due to, for example, a password change, exposure or change of a cryptographic key, a duration of time passing, etc. Following the event, the data processing system may no longer be trusted, and a secure communication channel may no longer be available.

The shared secret may be obtained using a data point obtained from the data processing system (obtained following loss of the root of trust) and an inference generated using the first inference model. The shared secret may include a difference based on the inference and the data point and/or any other metric.

The security questionnaire may include any number of security questions based on any number of shared secrets. The type and quantity of the security questions may depend on a security risk level of the data processing system. The security risk level may indicate the potential security risk to the network core in the event of a security breach of the data processing system. Therefore, a data processing system posing a more severe security threat to the network core may be provided with more advanced and/or a higher number of questions in the security questionnaire.

Figure 2A:
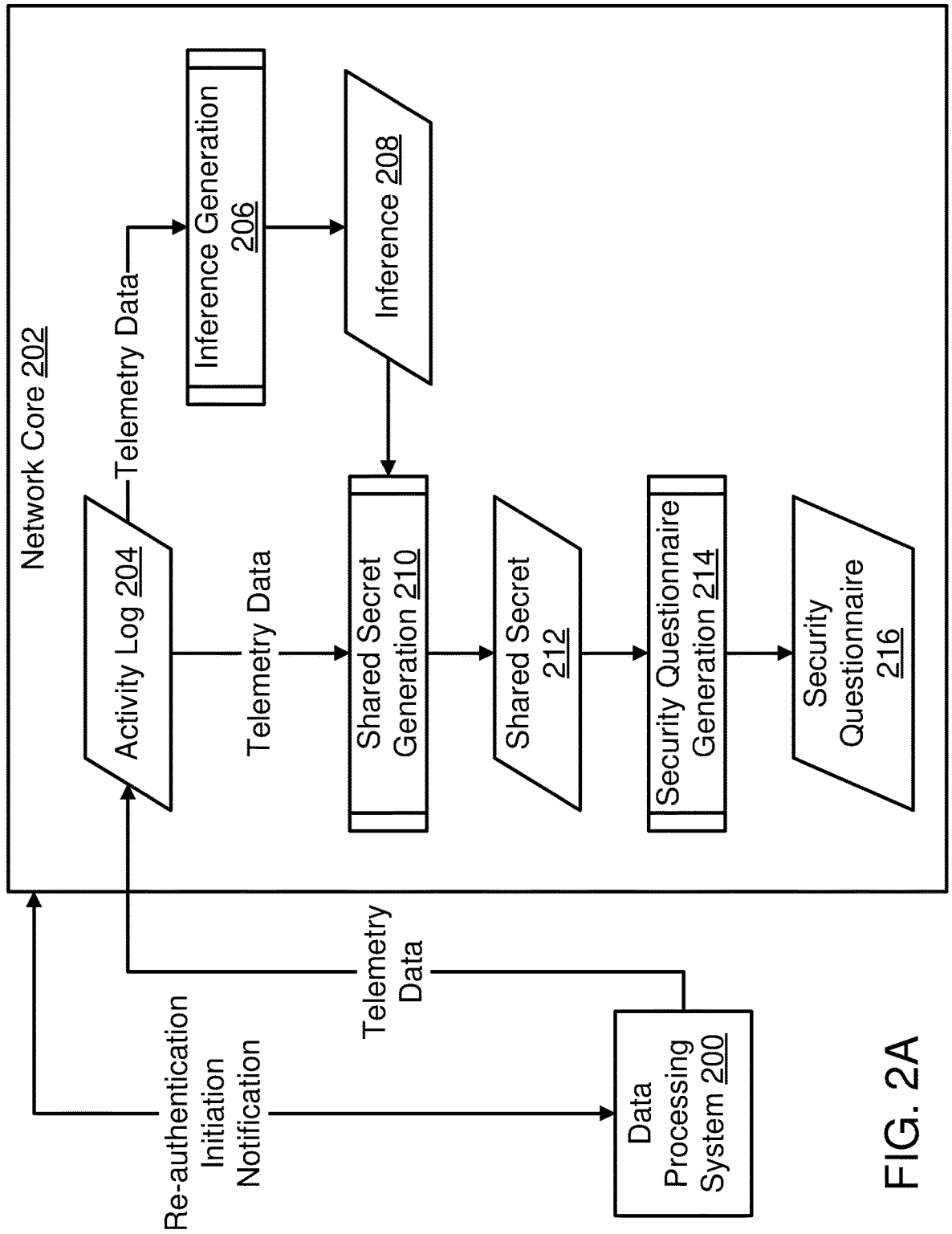
FIG. 2A shows a block diagram illustrating a network core generating a security questionnaire in accordance with an embodiment.
Figure 2B:
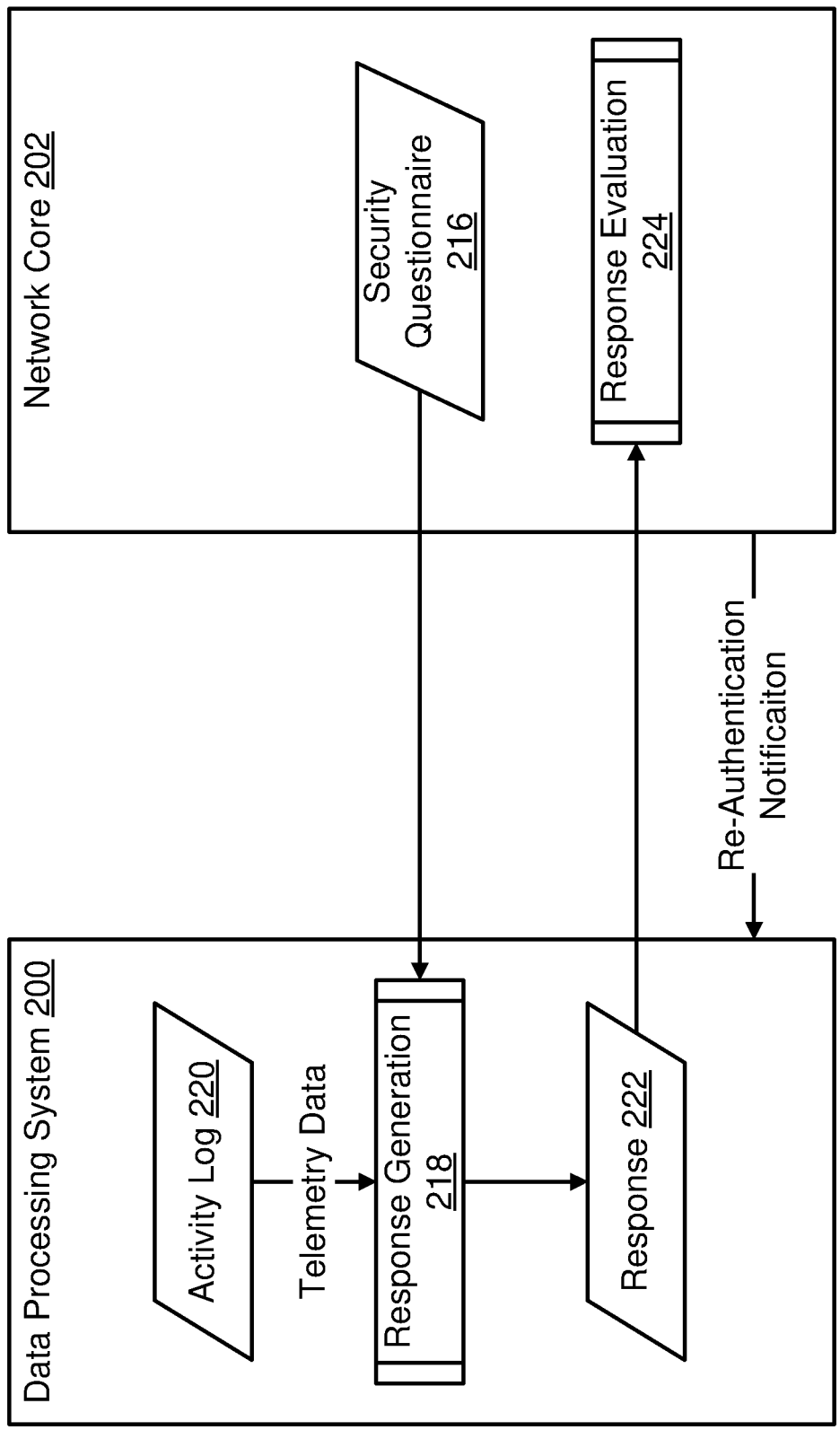
FIG. 2B shows a block diagram illustrating a network core authenticating a data processing system without user intervention in accordance with an embodiment.
Figure 3A:
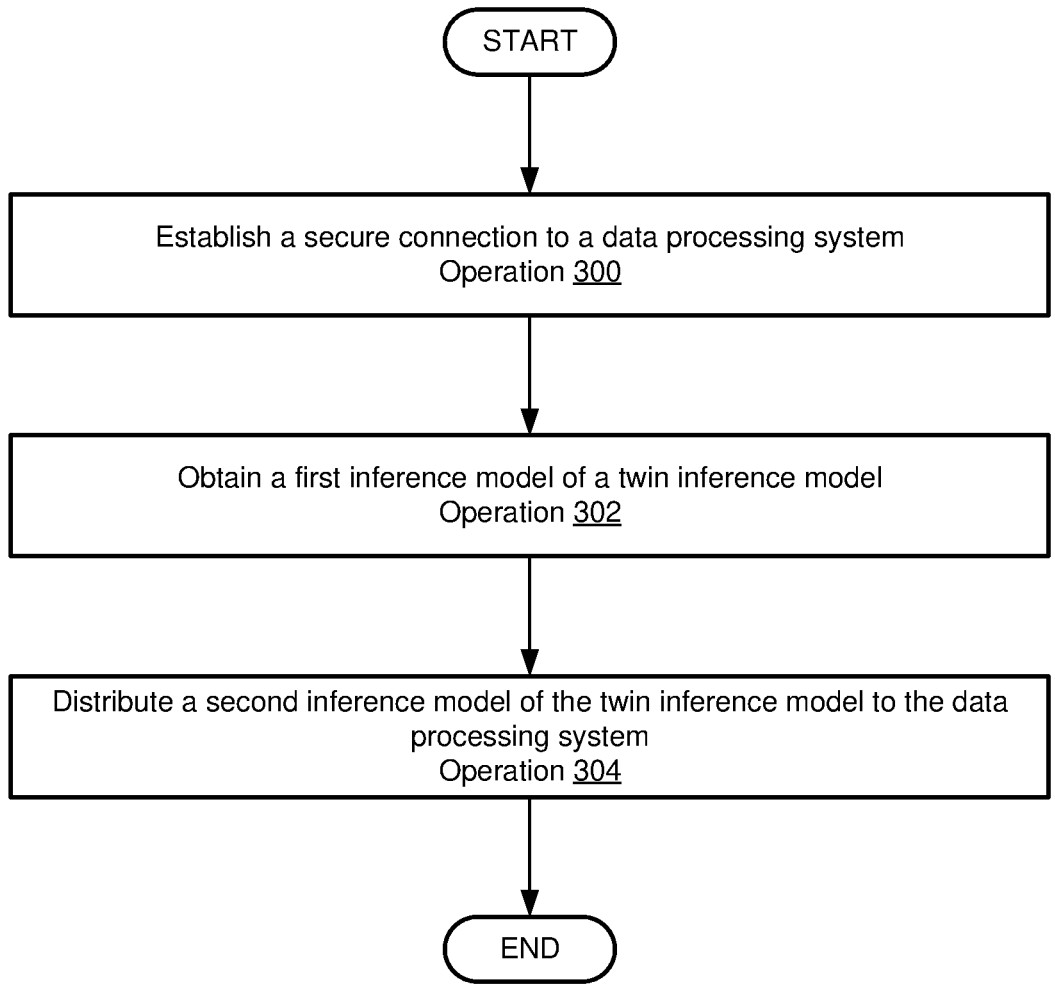
FIG. 3A shows a flow diagram illustrating a method of obtaining and distributing a twin inference model in accordance with an embodiment.
Figure 3B:
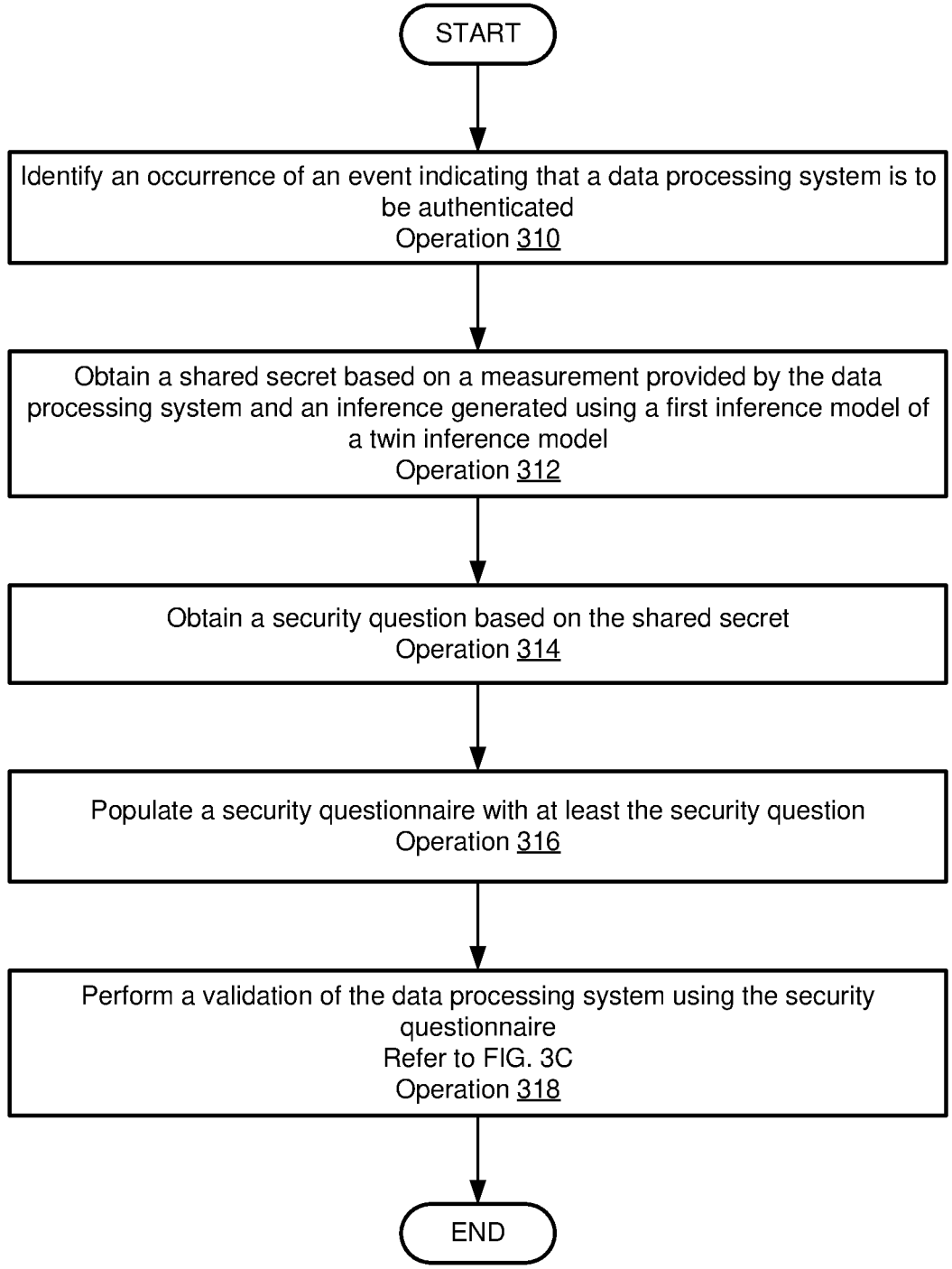
FIG. 3B shows a flow diagram illustrating a method of authenticating a data processing system without user intervention in accordance with an embodiment.
Figure 3C:
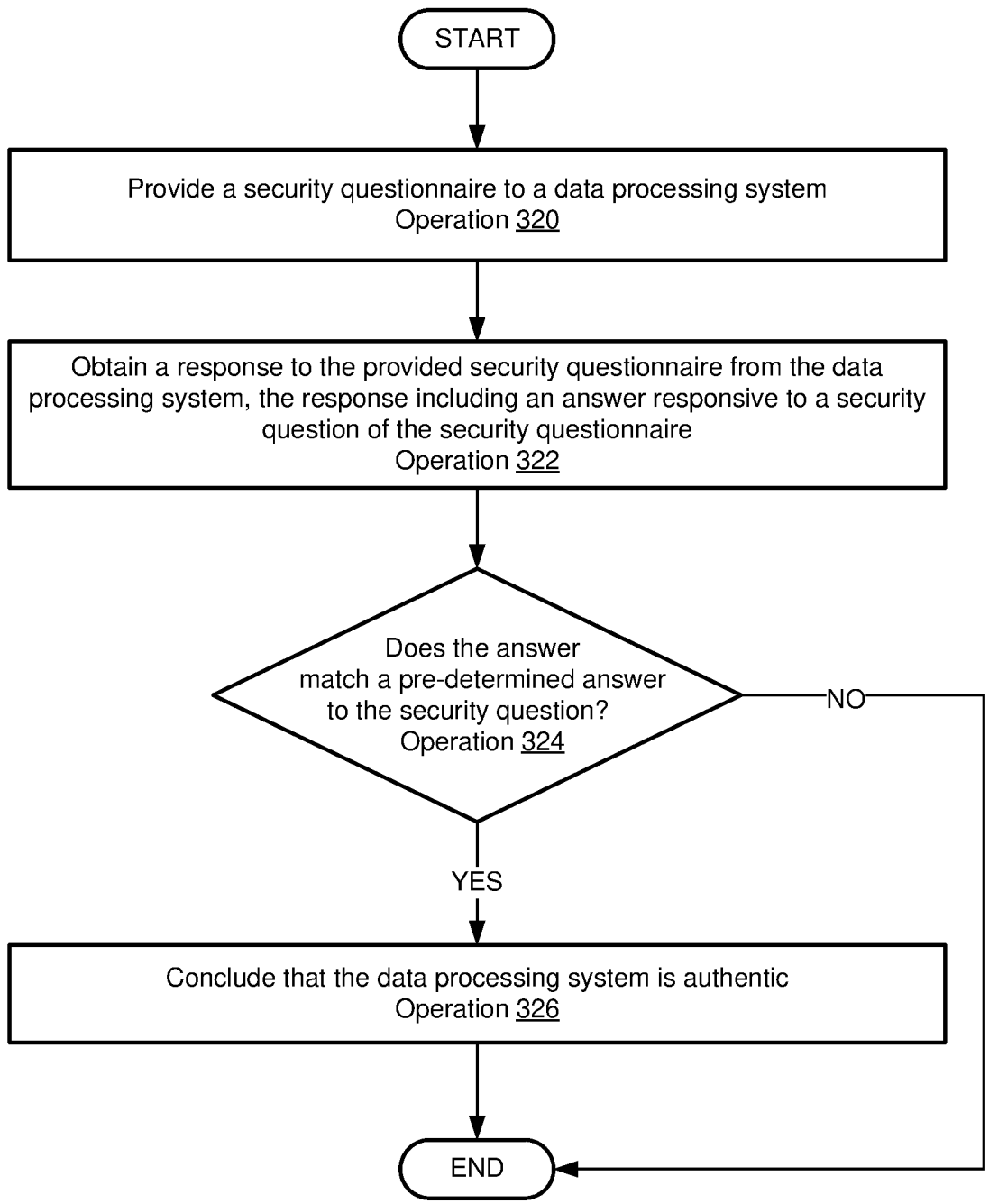
FIG. 3C shows a flow diagram illustrating a method of performing a validation of a data processing system in accordance with an embodiment.

When performing its functionality, network core 102 and/or data processing systems 100 may perform all, or a portion, of the methods and/or actions shown in FIGS. 2-3C.

Data processing systems 100 and/or network core 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data processing systems 100 and/or network core 102 are implemented using an internet of things (IoT) device, which may include a computing device. The IoT device may operate in accordance with a communication model and/or management model known to network core 102, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows and/or processes performed in a system in accordance with an embodiment are shown in FIGS. 2A-2B.

FIG. 2A shows a block diagram of network core 202 generating a security questionnaire in accordance with an embodiment. Network core 202 may be similar to network core 102 shown in FIG. 1. In FIG. 2A, network core 202 may be connected to data processing system 200 via a communication system (not shown). Data processing system 200 may be similar to any of data processing systems 100. Communications between network core 202 and data processing system 200 are illustrated using lines terminating in arrows.

As discussed above, network core 202 may perform computer-implemented services by authenticating devices throughout a distributed environment.

To authenticate devices, network core 202 may establish a root of trust with data processing system 200 (not shown). The root of trust may indicate that data processing system 200 is authenticated and may exchange secure communications with network core 202. The root of trust may be established via any means including, for example, a user entering a password, pin, biometric factor, etc.

The root of trust may be invalidated due to, for example, password changes, cryptographic key exposure, security certificate changes, and/or for other reasons. If the root of trust is lost, network core 202 may transmit a re-authentication initiation notification to data processing system 200. Data processing system 200 may transmit a response (not shown) to establish that data processing system 200 is ready to participate in a re-authentication process.

To re-authenticate data processing system 200 without user intervention, data processing system 200 may transmit telemetry data to network core 202. Network core 202 may store the telemetry data in activity log 204. Telemetry data may include any data related to the operation of data processing system 200 that may be useful to monitor and/or assess the performance, security, etc. of the data processing system. For example, telemetry data may include: (i) lifecycle data reflecting operation of the data processing system, (ii) content of messages transmitted from the data processing system to the network core, (iii) statistics associated with the operation of the data processing system, (iv) error event data reflecting a subset of the operation of the data processing system, the subset including undesired operation of the data processing system, and/or other data.

Network core 202 may perform inference generation 206 process using the telemetry data. Inference generation 206 process may include feeing a data point of the telemetry data from activity log 204 into a first inference model of a twin inference model to obtain inference 208. The first inference model of the twin inference model hosted by network core 202 may be a copy of a second inference model of the twin inference model hosted by data processing system 200. The twin inference model may be any type of predictive model (e.g., a neural network). The data point may represent a measurement provided by data processing system 200 to network core 202.

Network core 202 may perform shared secret generation 210 process using the telemetry data and inference 208 to obtain shared secret 212. Shared secret generation 210 process may include, for example, generation of a difference between inference 208 and the data point of the telemetry data used to generate inference 208. Inference 208 may be intended to predict the measurement represented by the data point. Shared secret 212 may include any form of shared knowledge known to network core 202 and data processing system 200 without transmission of the shared knowledge between the network core 202 and data processing system 200.

Shared secret 212 may be used for security questionnaire generation 214 process. To perform security questionnaire generation 214 process, network core 202 may populate security questionnaire 216 with at least a security question based on shared secret 212. Network core 202 may also generate a pre-determined acceptable answer to the security questions. The pre-determined answer may be obtained by the network core prior to obtaining the response and the pre-determined answer may be based, at least in part, on the difference.

Turning to FIG. 2B, network core 202 may transmit security questionnaire 216 to data processing system 200. Data processing system 200 may perform response generation 218 process using security questionnaire 216 to generate response 222. Response generation 218 process may include retrieving a portion of the telemetry data from activity log 220 to generate an answer to the security question. Activity log 220 may be substantially identical to activity log 204 of network core 202 (shown in FIG. 2A). Activity log 220 may be substantially identical to activity log 204 by storing the same data points. Delays in transmission of data points and/or other events may cause activity log 220 and/or activity log 204 to temporarily store non-identical data sets. Response 222 may include an answer that is responsive to the security question.

The answer may be based on a second difference, the second difference being identical to the first difference and being obtained using the data point and the second inference model of the twin inference model hosted by data processing system 200.

Data processing system 200 may transmit response 222 to network core 202 and network core 202 may perform response evaluation 224 process using the response 222 and the previously established set of acceptable answers (not shown). If the answers in response 222 match the answers in the set of acceptable answers (to a degree considered acceptable by network core 202), data processing system 200 may be concluded to be authentic. If the answers in response 222 do not match the answers in the set of acceptable answers, data processing system 200 may not be concluded to be authentic.

In response to concluding that data processing system 200 is authentic, network core 202 may transmit a re-authentication notification to notify data processing system 200 of successful re-authentication. By re-authenticating data processing system 200 without user intervention, authentication of devices throughout a distributed environment may be timely and computationally efficiently maintained.

In an embodiment, network core 202 is implemented using a processor adapted to execute computing code stored on a persistent storage that when executed by the processor performs the functionality of network core 202 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to perform device authentication in a distributed environment without user intervention. FIGS. 3A-3C illustrate methods that may be performed by the components of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of obtaining and distributing a twin inference model in accordance with an embodiment is shown. The method may be performed, for example, by a network core, data processing system, and/or any other device.

At operation 300, a secure connection is established to a data processing system. The secure connection may be established by: (i) establishing a root of trust between the network core and the data processing system via user intervention, and (ii) while the root of trust is in place, using the root of trust to establish a secure communication channel between the network core and the data processing system.

The root of trust may be established via a user providing an authentication factor (e.g., a password, a pin, a fingerprint, etc.). The user may provide the authentication factor by interacting with a graphical user interface (GUI) on a device (e.g., the data processing system and/or another device throughout the distributed environment). The root of trust may also be established via the user traveling to a particular location with a physical item (e.g., a token, card, etc.). Combinations of authentication factors may be used (e.g., a card and a password) to establish the root of trust. To establish the secure communication channel, the network core may transmit a shared secret (e.g., a secure cryptographic key) to the data processing system via a communication system.

At operation 302, a first inference model of a twin inference model is obtained. The first inference model may be obtained by (i) reading the first inference model from storage, (ii) receiving the first inference model from another device, and/or (iii) generating the first inference model, for example by programming a data processing system and/or another device. The first inference model may be a particular type of inference model, such as a linear regression model, a deep neural network, a decision tree, etc.

The first inference model may be generated using a training dataset. The training dataset may be obtained by (i) reading the training dataset from storage, (ii) receiving the training dataset from another device, and/or (iii) generating the training dataset, for example, by gathering and measuring information from one or more data sources. Training data included in the training dataset may be processed, cleansed and/or evaluated for quality in order to prepare the training dataset for use in training inference models.

The trained first inference model may be obtained by training the first inference model to relate pieces of data (e.g., an input and an output) from the training dataset using a training system. To do so, the training dataset and the first inference model may be input to the training system.

The training system may employ machine learning techniques such as supervised learning, unsupervised learning, semi-supervised learning, etc. As part of the training process, the first inference model may undergo a validation and/or testing step to improve and/or measure the reliability of generated inferences.

At operation 304, a second inference model of the twin inference model is distributed to the data processing system. To distribute the second inference model, a copy of the first inference model may be obtained and provided to the data processing system.

The copy of the first inference model may be read from storage, may be generated by performing a copying procedure to generate a new data structure including the architecture and parameters (e.g., neurons, weights, etc. of a neural network) of the second inference model, and/or via other processes.

The second inference model of the twin inference model may be distributed by transmitting the second inference model to the data processing system over a communication system, by transmitting instructions for how to retrieve the second inference model from a database, and/or by transmitting a request for another entity to transmit the inference model to the data processing system.

The method may end following operation 304.

Turning to FIG. 3B, a flow diagram illustrating a method of authenticating a data processing system without user intervention in accordance with an embodiment is shown. The method may be performed, for example, by a network core, data processing system, and/or any other device.

At operation 310, an occurrence of an event indicating that a data processing system is to be authenticated is identified. The occurrence of the event may place the previously established secure communication channel into a potentially compromised state. The occurrence of the event may be identified by: (i) receiving a notification that the secure connection has been lost, and/or (ii) terminating the secure connection. The secure connection may be terminated in response to an identification of: (i) a password change, (ii) exposure of the cryptographic key, (iii) a security certificate time-out, and/or other reasons.

Based on the occurrence of the event, the following operations may occur: (i) a data point may be obtained from the data processing system following a loss of a root of trust between the network core and the data processing system, and/or (ii) the data point may be stored in a first activity log hosted by the network core.

The data point may be obtained from the data processing system via a message transmitted over a communication system. The data point may also be obtained by reading the data point from storage, by receiving access credentials from the data processing system to access the data point from a database, by requesting the data point from another entity, and/or via other methods.

The data point may be stored in the first activity log by encapsulating the data point in a data structure and initiating a storage procedure to add the data point to the first activity log. The data point may also be stored in the first activity log by transmitting the data point to another entity responsible for hosting the first activity log.

At operation 312, a shared secret is obtained based on a measurement provided by the data processing system and an inference generated using a first inference model of a twin inference model. Obtaining the shared secret may include: (i) obtaining a data point of the telemetry data from the first activity log, (ii) obtaining an inference using the first inference model of the twin inference model, and/or (iii) obtaining a difference based on the data point and the inference.

The data point may be obtained by reading the data point from storage (e.g., the first activity log and/or other storage locations), by requesting the data point from another entity, via a transmission from the data processing system using a secure connection, and/or via other methods. The data point may represent the measurement provided by the data processing system. The measurement may be performed by any data source (e.g., a sensor or other device) throughout the distributed environment.

The inference may be obtained by feeding the data point into the first inference model as input for the first inference model and obtaining the inference as output from the first inference model. The inference may also be obtained by transmitting the data point to another entity responsible for hosting and operating the first inference model. The inference may be obtained via other methods (e.g., by reading the inference from storage, etc.) without departing from embodiments disclosed herein.

The difference may be obtained by performing an operation using the data point and the inference. For example, a first numerical value associated with the inference may be subtracted from a second numerical value associated with the data point. The difference may also be obtained by reading the difference from storage, by receiving the difference from another entity, and/or via other methods.

At operation 314, a security question based on the shared secret is obtained. The security question may be obtained by feeding the difference (and/or other data) into a third inference model (e.g., a neural network) or rules-based engine trained to form questions based on input data. The security question may also be obtained by transmitting the difference (and/or other data) to another device responsible for generating security questions and receiving the security question as a response from the device.

At operation 316, a security questionnaire is obtained using at least the security question. Obtaining the security questionnaire may include: (i) populating a security questionnaire with at least the security question, and/or (ii) obtaining a pre-determined answer for the security question. The security questionnaire may be obtained via other methods (e.g., reading the security questionnaire from storage, requesting the security questionnaire from another entity) without departing from embodiments disclosed herein.

The security questionnaire may be populated with at least the security question by generating a data structure to be treated as the security questionnaire and adding at least the security question to the data structure. The security question (and/or other security questions) may also be added to an existing security questionnaire and previous security questions in the existing security questionnaire may be adapted, deleted, or analyzed to determine continued relevance.

The security questionnaire may be populated with at least the security question by transmitting the security question (and/or other security questions) to another device responsible for generating the security questionnaire.

The pre-determined answer for each answer of the answers may be obtained by feeding the security questionnaire, the difference, and/or other data into a fourth inference model trained to generate possible acceptable answers to each security question of the security questionnaire. The possible acceptable answers may be added to a (previously generated or newly generated) data structure to be treated as the pre-determined answers. The pre-determined answer may be obtained by reading the pre-determined answer from storage and/or by requesting the pre-determined answer from another entity.

At operation 318, a validation is performed of the data processing system using the security questionnaire. Performing the validation of the data processing system may include: (i) providing the security questionnaire to the data processing system, (ii) obtaining a response to the provided security questionnaire from the data processing system, (iii) determining whether an answer included in the response matches a pre-determined answer to the security question, and/or (iv) if the answer matches the pre-determined answer, concluding that the data processing system is authentic. Refer to FIG. 3C for additional details regarding performing the validation of the data processing system.

The method may end following operation 320.

Turning to FIG. 3C, a flow diagram illustrating a method of performing a validation of the data processing system in accordance with an embodiment is shown. The method may be performed, for example, by a network core, data processing system, and/or any other device. The operations shown in FIG. 3C may be an expansion of operation 318 in FIG. 3C.

At operation 320, the security questionnaire is provided to the data processing system. The security questionnaire may be transmitted to the data processing system over a communication system. The security questionnaire may be transmitted automatically when the security questionnaire is generated, may be transmitted upon receipt of a notification that the data processing system is ready to receive the security questionnaire and/or may be transmitted based on any other schedule. The security questionnaire may be provided to the data processing system by sending a notification to another device storing the security questionnaire to transmit the security questionnaire to the data processing system.

At operation 322, a response to the provided security questionnaire is obtained from the data processing system, the response including an answer responsive to the security question of the security questionnaire. The response may be obtained via a message transmitted by the data processing system over the communication system. Obtaining the response may include decrypting the response using a previously shared cryptographic key, by generating a hash of the pre-determined answer to compare to a hash included in the response, and/or other security measures.

At operation 324, it is determined whether the answer matches a pre-determined answer to the security question. If the answer matches the pre-determined answer, the method may proceed to operation 326. If each answer of the response does not match the pre-determined answer from the set of possible answers, the method may end following operation 324.

Whether the answer matches the pre-determined answer may be determined by: (i) obtaining the answer from the response, the answer corresponding to the security question, (ii) determining whether the answer matches the corresponding pre-determined answer (e.g., potentially including a set of possible answers), and (iii) if the answer matches the corresponding pre-determined answer, treating the answer as accurate.

Obtaining the answer from the response may include parsing the response into answers to each security question (if the security questionnaire includes more than one security question) and selecting the answer corresponding to the security question from the parsed response. The answer may be selected at random, may be selected by selecting the first question in the security questionnaire, and/or may be selected via another selection methodology. The response may also be transmitted to another device responsible for selecting the answer.

To determine whether the answer matches the pre-determined answer, the pre-determined answer may be obtained. The pre-determined answer (or answers) corresponding to the security question may be selected from the set of possible answers, and the answer may be compared to the pre-determined answer or answers. If the answer matches the pre-determined answer (at least substantially or to an extent determined acceptable), the answer may be considered accurate.

The above-described process may be repeated for any number of answers included in the response until all answers included in the response have been determined to be accurate or inaccurate.

At operation 326, the data processing system is concluded to be authentic. The data processing system may be concluded to be authentic without the user intervention. Concluding the data processing system to be authentic may include evaluating the accuracy of answers in the response to determine whether the response is accurate enough to consider the data processing system to be authentic. Evaluating the accuracy of the answers in the response may include comparing the number of correct answers to a previously determined amount of acceptable correct answers. Evaluating the accuracy of the answers may be performed via other means, such as comparing a percent accuracy to an acceptable percentage of accuracy, etc. If the answers in the response are considered acceptably accurate, the data processing system may be concluded to be authentic, and the root of trust may be re-established without user intervention. Re-establishing the root of trust may include establishing a new secure communications channel to the data processing system and distributing a new cryptographic key to the data processing system.

The method may end following operation 326.

Turning to FIGS. 4A-4E, these figures may illustrate a system similar to that of FIG. 1 in accordance with an embodiment. FIGS. 4A-4E may show actions performed by the system over time. The system may include temperature sensor 400 and reaction vessel monitoring system 401. Temperature sensor 400 may be operably connected to reaction vessel monitoring system 401 via communication system 101.

Figure 4A:
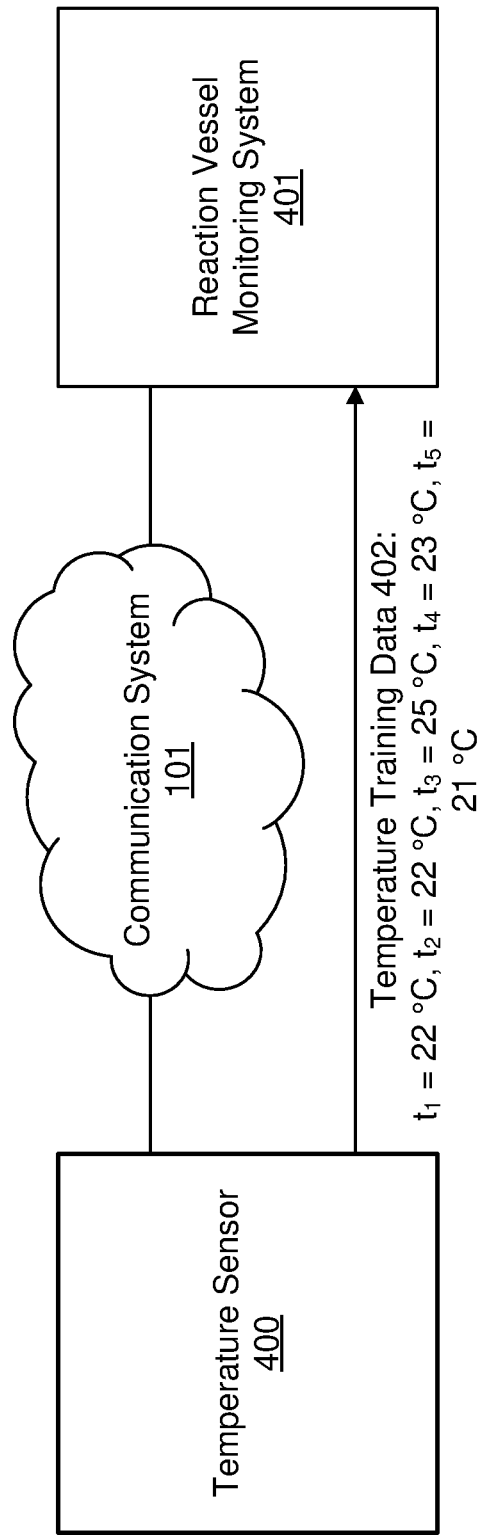
FIGS. 4A-4E show block diagrams illustrating a system in accordance with an embodiment over time.

Turning to FIG. 4A, consider a scenario where temperature sensor 400 collects temperature training data 402 from a reaction vessel. Temperature training data 402 may be collected at various time intervals (e.g., $t_1$, $t_2$, etc.) over the course of one hour and may include the following: $t_1=22°$ C., $t_2=22°$ C., $t_3=25°$ C., $t_4=23°$ C., $t_5=21°$ C. Reaction vessel monitoring system 401 may obtain temperature training data 402 for the purpose of training a twin inference model to predict future temperature measurements obtained by temperature sensor 400.

Figure 4B:
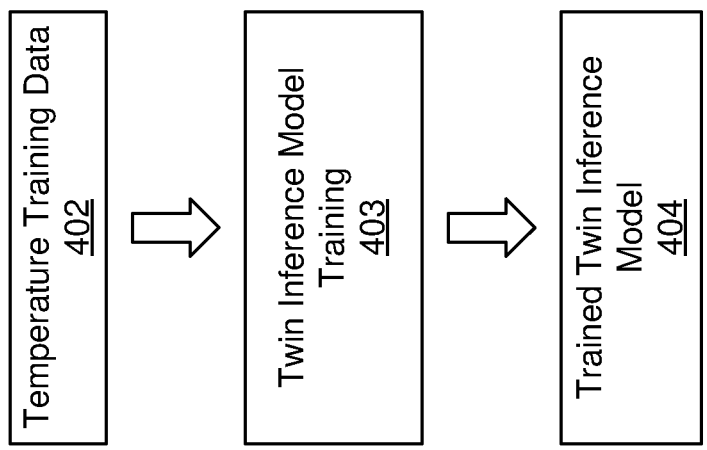

Reaction vessel monitoring system 401 may train a twin inference model based on temperature training data 402 to obtain a trained twin inference model. Turning to FIG. 4B, a twin inference model training process is illustrated. During these training processes, temperature training data 402 may be used to perform twin inference model training 403 process to obtain trained twin inference model 404. For example, reaction vessel monitoring system 401 may perform portions of the methods illustrated in FIG. 3A to obtain trained twin inference model 404.

Figure 4C:
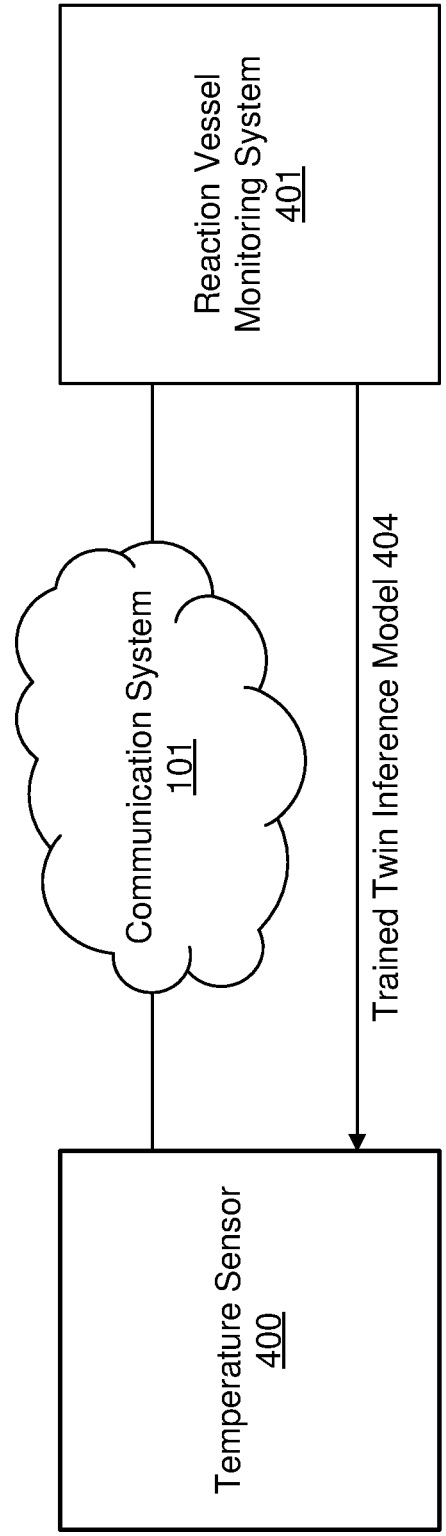

Turning to FIG. 4C, reaction vessel monitoring system 401 may distribute a copy of trained twin inference model 404 to temperature sensor 400. A second copy of trained twin inference model 404 may be hosted by reaction vessel monitoring system 401. Therefore, temperature sensor 400 and reaction vessel monitoring system 401 may have access to identical twin inference model inferences generated by each copy of the twin inference model as described below.

Figure 4D:
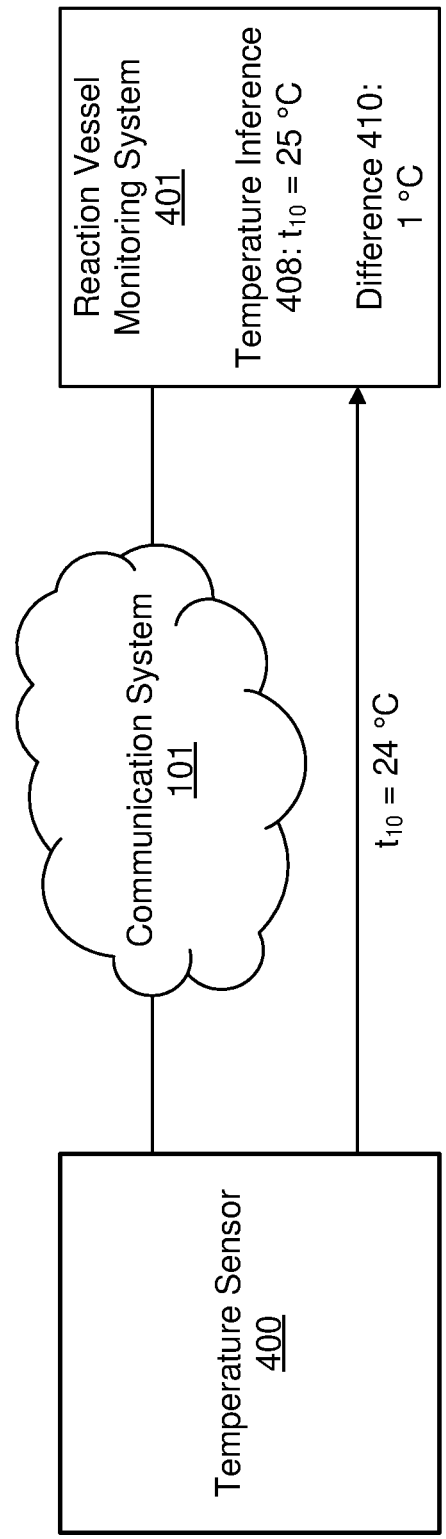

Turning to FIG. 4D, a root of trust may be lost between temperature sensor 400 and reaction vessel monitoring system 401. To re-establish the root of trust, temperature sensor 400 may transmit a data point ($t_{10}=24°$ C.) to reaction vessel monitoring system 401. Reaction vessel monitoring system 401 may use the data point to generate shared knowledge usable to re-authenticate temperature sensor 400.

To generate the shared knowledge, reaction vessel monitoring system 401 may feed the data point into the copy of the twin inference model hosted by reaction vessel monitoring system 401 to obtain temperature inference 408 of $t_{10}=25°$ C. Reaction vessel monitoring system 401 may utilize the data point and temperature inference 408 to generate difference 410 of 1° C. Difference 410 may be treated as the shared knowledge.

Reaction vessel monitoring system 401 may utilize difference 410 to generate a security question. For example, the security question may request temperature sensor 400 to provide a difference between a data point closest to a particular timestamp and an inference based on that data point. The security question may be added to a security questionnaire.

Figure 4E:
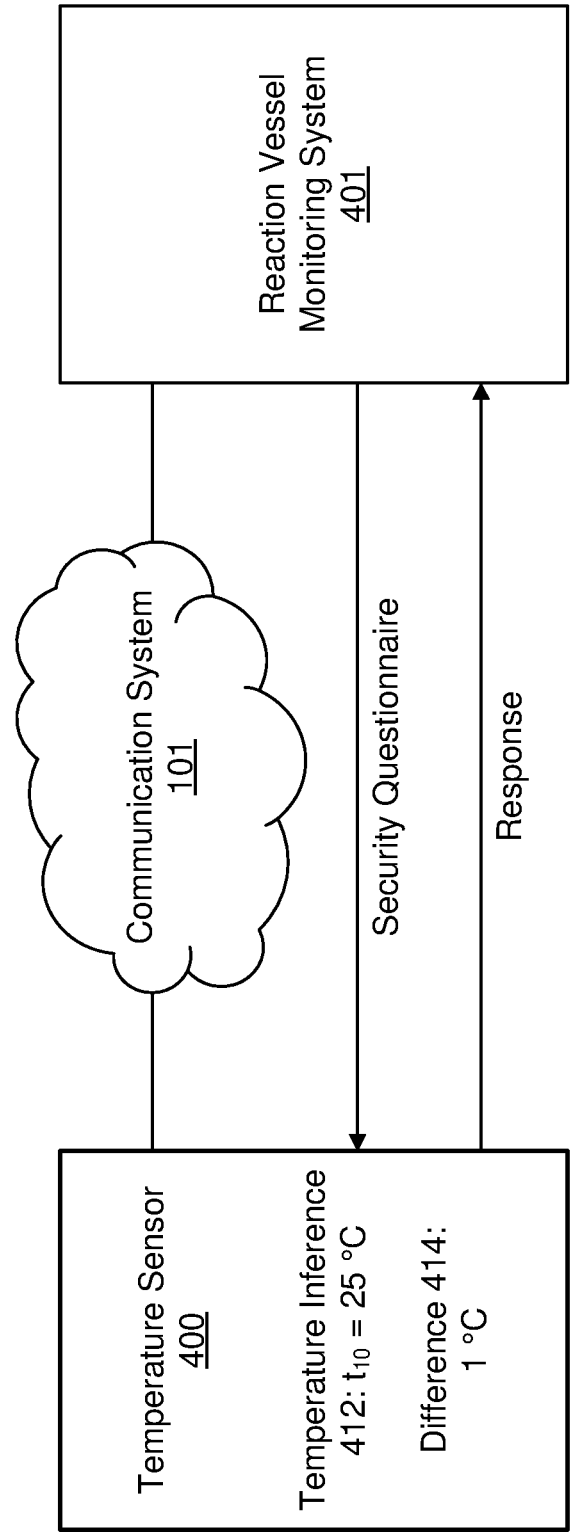

Turning to FIG. 4E, reaction vessel monitoring system 401 may transmit the security questionnaire to temperature sensor 400. Temperature sensor 400 may have access to the timestamp associated with the data point and may determine that the security question is referencing the previously described data point of $t_{10}=24°$ C. Temperature sensor may utilize the data point and the copy of the twin inference model hosted by temperature sensor 400 to generate temperature inference 412 of $t_{10}=25°$ C. Temperature sensor 400 may then be able to generate difference 414 of 1° C. Temperature sensor 400 may include the difference in a response and may transmit the response to reaction vessel monitoring system 401.

Reaction vessel monitoring system may determine that the answer in the response matches a pre-determined answer (1° C.) and may determine that temperature sensor 400 is authentic. The root of trust may be re-established between temperature sensor 400 and reaction vessel monitoring system 401 without user intervention.

Any of the components illustrated in FIGS. 1-4E may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of authenticating a data processing system by a network core throughout a distributed environment, the method comprising:
   identifying an occurrence of an event indicating that the data processing system is to be authenticated;
   based on the occurrence of the event:
      obtaining a shared secret, based on a measurement provided by the data processing system and an inference generated using a first inference model of a twin inference model, by at least:
         obtaining a data point from a first activity log, the data point representing the measurement provided by the data processing system;
         obtaining the inference using the first inference model of the twin inference model, the inference being intended to predict the measurement represented by the data point; and
         obtaining a first difference based on the data point and the inference;
      obtaining a security question based on the shared secret;
      obtaining a security questionnaire using at least the security question; and
      performing a validation of the data processing system using the security questionnaire.

2. The method of claim 1, wherein the first inference model of the twin inference model hosted by the network core is a copy of a second inference model of the twin inference model hosted by the data processing system.

3. The method of claim 2, further comprising:
   prior to identifying the occurrence of first event:
      obtaining the first inference model of the twin inference model; and
      distributing the second inference model of the twin inference model to the data processing system.

4. The method of claim 3, further comprising:
   based on the occurrence of the event:
      obtaining the data point from the data processing system following a loss of a root of trust between the network core and the data processing system; and
      storing the data point in the first activity log, the first activity log being hosted by the network core and being substantially identical to a second activity log hosted by the data processing system.

5. The method of claim 4, wherein performing the validation of the data processing system comprises:

providing the security questionnaire to the data processing system;
obtaining a response to the provided security questionnaire from the data processing system, the response comprising an answer responsive to the security question of the security questionnaire;
making a determination regarding whether the answer matches a pre-determined answer to the security question; and
in an instance of the determination in which the answer matches the pre-determined answer:
concluding that the data processing system is authentic.

6. The method of claim 5, wherein the pre-determined answer is obtained by the network core prior to obtaining the response and the pre-determined answer is based, at least in part, on the first difference.

7. The method of claim 6, wherein the answer is based on a second difference, the second difference being identical to the first difference and being obtained using the data point and the second inference model of the twin inference model hosted by the data processing system.

8. A non-transitory machine-readable medium having instructions stored therein, which when executed by a processor, cause the processor to perform operations for authenticating a data processing system by a network core throughout a distributed environment, the operations comprising:
identifying an occurrence of an event indicating that the data processing system is to be authenticated;
based on the occurrence of the event:
obtaining a shared secret, based on a measurement provided by the data processing system and an inference generated using a first inference model of a twin inference model, by at least:
obtaining a data point from a first activity log, the data point representing the measurement provided by the data processing system;
obtaining the inference using the first inference model of the twin inference model, the inference being intended to predict the measurement represented by the data point; and
obtaining a first difference based on the data point and the inference;
obtaining a security question based on the shared secret;
obtaining a security questionnaire using at least the security question; and
performing a validation of the data processing system using the security questionnaire.

9. The non-transitory machine-readable medium of claim 8, wherein the first inference model of the twin inference model hosted by the network core is a copy of a second inference model of the twin inference model hosted by the data processing system.

10. The non-transitory machine-readable medium of claim 9, the operations further comprising:
prior to identifying the occurrence of the event:
obtaining the first inference model of the twin inference model; and
distributing the second inference model of the twin inference model to the data processing system.

11. The non-transitory machine-readable medium of claim 8, the operations further comprising:
based on the occurrence of the event:
obtaining the data point from the data processing system following a loss of a root of trust between the network core and the data processing system; and
storing the data point in the first activity log, the first activity log being hosted by the network core and being substantially identical to a second activity log hosted by the data processing system.

12. The non-transitory machine-readable medium of claim 11, wherein performing the validation of the data processing system comprises:
providing the security questionnaire to the data processing system;
obtaining a response to the provided security questionnaire from the data processing system, the response comprising an answer responsive to the security question of the security questionnaire;
making a determination regarding whether the answer matches a pre-determined answer to the security question; and
in an instance of the determination in which the answer matches the pre-determined answer:
concluding that the data processing system is authentic.

13. A system comprising:
a processor; and
a memory coupled to the processor to store instructions, which when executed by the processor, cause the processor to perform operations for authenticating a data processing system by a network core throughout a distributed environment, the operations comprising:
identifying an occurrence of an event indicating that the data processing system is to be authenticated;
based on the occurrence of the event:
obtaining a shared secret, based on a measurement provided by the data processing system and an inference generated using a first inference model of a twin inference model, by at least:
obtaining a data point from a first activity log, the data point representing the measurement provided by the data processing system;
obtaining the inference using the first inference model of the twin inference model, the inference being intended to predict the measurement represented by the data point; and
obtaining a first difference based on the data point and the inference;
obtaining a security question based on the shared secret;
obtaining a security questionnaire using at least the security question; and
performing a validation of the data processing system using the security questionnaire.

14. The system of claim 13, wherein the first inference model of the twin inference model hosted by the network core is a copy of a second inference model of the twin inference model hosted by the data processing system.

15. The system of claim 14, wherein the operations further comprise:
prior to identifying the occurrence of the event:
obtaining the first inference model of the twin inference model; and
distributing the second inference model of the twin inference model to the data processing system.

16. The system of claim 13, wherein the operations further comprise:
based on the occurrence of the event:
obtaining the data point from the data processing system following a loss of a root of trust between the network core and the data processing system; and
storing the data point in the first activity log, the first activity log being hosted by the network core and being substantially identical to a second activity log hosted by the data processing system.

17. The system of claim 16, wherein performing the validation of the data processing system comprises:
providing the security questionnaire to the data processing system;
obtaining a response to the provided security questionnaire from the data processing system, the response comprising an answer responsive to the security question of the security questionnaire;
making a determination regarding whether the answer matches a pre-determined answer to the security question; and
in an instance of the determination in which the answer matches the pre-determined answer:
concluding that the data processing system is authentic.

18. The non-transitory machine-readable medium of claim 12, wherein the pre-determined answer is obtained by the network core prior to obtaining the response and the pre-determined answer is based, at least in part, on the first difference.

19. The non-transitory machine-readable medium of claim 18, wherein the answer is based on a second difference, the second difference being identical to the first difference and being obtained using the data point and the second inference model of the twin inference model hosted by the data processing system.

20. The system of claim 17, wherein the pre-determined answer is obtained by the network core prior to obtaining the response and the pre-determined answer is based, at least in part, on the first difference.

* * * * *